United States Patent [19]

Mesnel et al.

[11] Patent Number: 4,744,173
[45] Date of Patent: May 17, 1988

[54] MOVABLE FLUSH WINDOW SYSTEM ESPECIALLY FOR A MOTOR VEHICLE DOOR

[75] Inventors: Gerard Mesnel, Carrieres-sur-Seine; Francois Mesnel, Neuilly-sur-Seine, both of France

[73] Assignee: Mesnel S.A., Carrieres-sur-Seine, France

[21] Appl. No.: 49,113

[22] Filed: May 13, 1987

[30] Foreign Application Priority Data

Oct. 3, 1986 [FR] France ................ 86 13816

[51] Int. Cl.$^4$ ............................................. E05F 11/38
[52] U.S. Cl. ........................................ 49/374; 49/377; 49/502; 49/506
[58] Field of Search ............... 49/374, 375, 376, 377, 49/378, 502, 506; 296/146

[56] References Cited

U.S. PATENT DOCUMENTS

| 4,330,959 | 5/1982 | Nishikawa | 49/377 |
| 4,481,736 | 11/1984 | Norton | 49/374 |
| 4,561,211 | 12/1985 | Raley et al. | 49/374 |

Primary Examiner—Philip C. Kannan
Attorney, Agent, or Firm—Foley & Lardner, Schwartz, Jeffery, Schwaab, Mack, Blumenthal & Evans

[57] ABSTRACT

A movable flush window system, especially for a motor vehicle door comprises two stamped metal panels welded together so as to form a rebate at the periphery of the location of the window, on the sides other than that on which the window can be retracted between the panels. The window system further comprises two non-parallel panes, the spacing of which decreases from their base to their upper part, the windows being joined together near their periphery by means of a continuous spacer fixed to the two opposing faces and defining, with the contiguous outer portions of the panes, a U-shaped profile intended to cap the rebate in order to ensure the guidance and sealed closure of the window.

15 Claims, 2 Drawing Sheets

MOVABLE FLUSH WINDOW SYSTEM ESPECIALLY FOR A MOTOR VEHICLE DOOR

BACKGROUND OF THE INVENTION

The present invention relates to a new movable flush window system especially for a motor vehicle door.

As is known, it has become customary to make motor vehicle doors from two stamped panels, one on the outside and the other on the inside, joined together by welding, particularly at the periphery of the windows. This design has caused a radical development in the means for the guidance, sliding and soundproofing of the movable windows. These developments are illustrated in the following: French Pat. No. 2,521,497 and certificates of addition Nos. 2,543,207 and 2,564,047.

The development of bodies on which the air streams flow along the outer surfaces, causing as few eddies as possible, in order to increase the coefficient of penetration Cx of the vehicles in the atmosphere, has also prompted the manufacturers to review the window systems of motor vehicle doors. This review has provided movable windows which are flush with the outer face of the door and which are therefore called "flush" windows, also known as "flush glass" as illustrated by French Pat. No. 2,543,074.

SUMMARY OF THE INVENTION

It is therefore an object of the present invention to provide a new guide, sliding and sealing system which is intended for flush windows and which is conducive to ensuring that the window is flush, as desired, at the same time only requiring minor modifications to the body.

It is also an object of the present invention to provide such a window system for motor vehicle doors which considerably reduces, within the vehicle, the outside road and air noises which when the vehicle is traveling at high speed, and at the same time improving the thermal insulation of the vehicle.

It is a further object of the present invention to provide a window system which ensures increased sealing in the region of the windows.

Another object of the present invention is to provide a window having a pane that can overlap the door panel and match the curvature of the door.

Yet another object of the present invention is to provide a window system that can improve the coefficient of air penetration of the vehicle.

In accordance with one aspect of the present invention these objects are achieved by a movable flush window system, especially for a motor vehicle door, comprising:

(a) two panels connected together forming a door having a window aperture;

(b) a movable window comprising two substantially non-parallel panes, the window being retractable between the two panels;

(c) means, disposed on the sides of the panels adjacent the aperture other than the side on which the window can be retracted between the panels, for engaging the window at the periphery thereof;

(d) means, joined to the two panes at the periphery thereof, for spacing apart the two panes the spacing of which decreases from the base of the panes to the upper part of the panes, the spacing means defining with the contiguous outer portions of the two panes a substantially U-shaped profile for receiving the engaging means so as to guide and seal the closure of the window in the aperture.

In accordance with another aspect of the present invention these objects are achieved by a flush window system further comprising a sealing strip disposed adjacent the aperture on the side of an outer one of the panels on which the window can be retacted between the panels.

Other objects, features and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An illustrative embodiment of the invention is described in further detail below, with reference to the accompanying non-limiting drawings, in which.

DETAILED DESCRIPTION OF PREFERRED EMBODIMENTS

Figure 1:
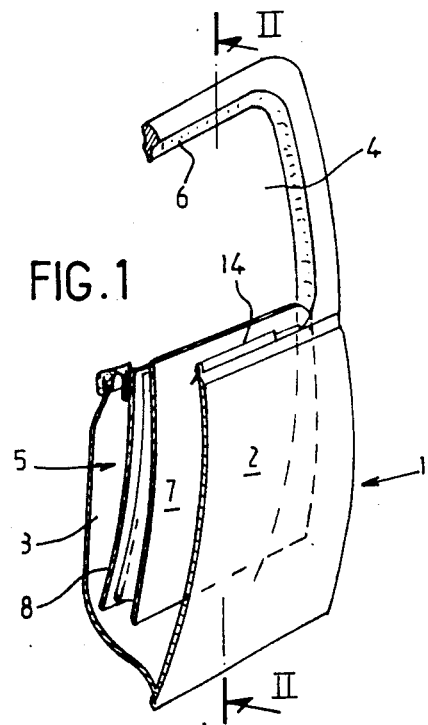
FIG. 1 is a perspective partial diagrammatic view of a motor vehicle door equipped with the window system according to the invention, with the window in the lowered position.

The present invention is a movable flush window system, especially for a motor vehicle door comprising two stamped metal panels welded to one another so as to form a rebate on the periphery of the location for the window, on the sides other than that on which the window can be retracted between the panels. The window system comprises two non-parallel panes, the spacing of which decreases from their base to their upper part, the panes are joined together near their periphery by means of a continuous spacer fixed to the two opposing faces and defining, with the contiguous outer portions of the panes, a U-shaped profile for capping the rebate in order to ensure the guidance and sealed closure of the window.

According to the present invention, the term "pane" embraces not only glass panels, but also any transparent, translucid or opaque plastic panel.

To make it easier for the window to slide, the rebate can be covered by a section coated with a material having a high sliding coefficient.

. An important feature of the invention is therefore that the window slides on the rebate which is integrally formed with the door. In contrast, in conventional systems the window slides in a guide element, and fits completely into the guide element closed position. In the present invention, the guide element is formed by the rebate which is engaged into the space separating the window-pane assembly.

Moreover, because two non-parallel panes are used, it is possible to arrange the outer pane substantially in the extension of the lower part of the outer panel of the door, at the same time matching the door curvature and thus improving the aerodynamic characteristics of the vehicle considerably.

An upward movement of the window comprising the two panes when closing the window, results in an increase at the base of the frame in the distance separating the two panes and thus an increase in the thickness of the assembly. Consequently, an increased perpendicular pressure is exerted by the outer pane on the outer body sealing strip or "wiper" carried by the body, thus ensuring perfect sealing of the assembly at the end of the window path when in the closed position.

The section with which the rebate is equipped has, for example, a reinforcement which is made of aluminum, but which could, if appropriate, also be made of any other metal or alloy. The material having a high sliding coefficient, with which this reinforcement is coated, can be composed of any product used for this purpose in the art such as a fabric, produots based on "Teflon" a registered trademark, or the like.

Preferably, the section with which the rebate is equipped also includes window and body-sealing members such as lips made of flexible and deformable rubber.

Additionally, as with double glazing used in buildings, the thermal insulation and soundproofing obtained by means of the window according to the present invention is improved considerably.

Preferably, to prevent any phenomenon of sound resonance, the two panes constituting the window have different thicknesses, the thicker pane being on the outside.

The spacer material joining the two panes together connects the two opposing surfaces chemically and physically. The spacer can be an elastomeric, plastomeric or vitreous ceramic type material, but preferably flexible in order to compensate for the surface defects of the panes or body.

When the windows are closed, the motor vehicle will thus be a true closed box in which the changes in plane attributable to the windows are reduced to the strict minimum, thus making it possible to improve the coefficient of air penetration of the vehicle.

The drawings are drawn not to scale, and the difference in the spacing of the two panes between the top and bottom of the window has been greatly exaggerated in an effort to make it easy to understand the system.

The motor vehicle door 1 illustrated in the drawings comprises two stamped panels, one on the outside 2 and the other on the inside 3 which are joined together by welding.

The aperture 4, which is closed off by a movable window designated by the general reference numeral 5, is obtained when the panels 2 and 3 are cut out, stamped on the periphery of the cut-out and joined together by means of spotwelding in their upper part and along the side edges of the aperture to form a rebate 6. The rebate 6 is defined along one side of a flange formed by the mating peripheral edges of the panels.

According to the present invention, the door rebate 6 with the adjacent flange forms the guide and sliding member for the window 5. This window 5 comprises two non-parallel panes 7 and 8, the spacing of which decreases from the base of the window to the upper part. These panes are joined to one another, at a short distance from their periphery, by a spacer 9 fixed to the two opposing faces and defining, with the contiguous outer parts of the panes 7 and 8, a recess of U-shaped cross-section intended for capping the rebate 6, in order to slide thereon, and for sealing off the aperture 4. The recess caps the whole of the rebate 6 over its entire length, as can be seen in FIGS. 3 and 4.

To ensure that the window slides easily, the rebate 6 is covered by a section 10 which has an aluminum reinforcement faced with a rubber or plastic polymer and which is covered with a material 11 having a high sliding coefficient such as a fabric or the like. The reinforcement section 10 also includes sealing lips 12 and 13 made of flexible rubber, which are curved towards the panes and which form the sealing system for the panes.

At the base of the window frame, a body sealing strip 14, also called a "wiper", is included in the outer panel 2 of the door. Initially, when the pane is lowered as shown in FIG. 1, the sealing strip 14 is not in contact with the window. As the window rises the distance separating the panes 7 and 8 in the region of the strip 14 in proportion increases continuously, thus first bringing the pane 7 into contact with the strip 14 and then causing the pane to exert an increasing pressure perpendicular to the strip, thereby ensuring perfect sealing when the window is in the closed position as shown in FIGS. 3 and 4. Since the strip 14 is not subject to high compression until the end of travel, the rising movement of the window is only slightly braked by the strip and then only at the end of travel.

Figure 3:
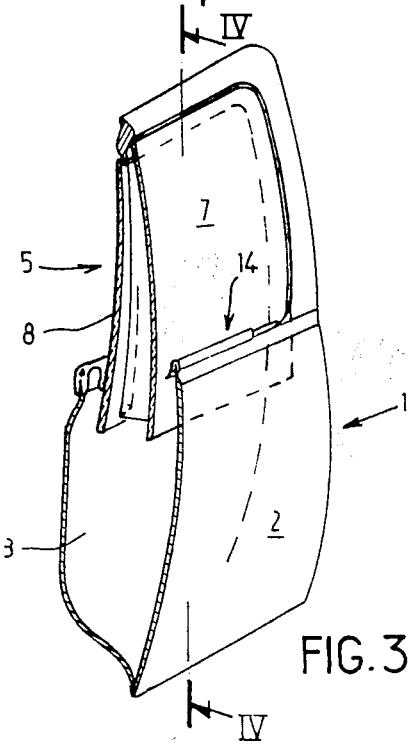
FIG. 3 is a view similar to that of FIG. 1, with the window in the raised position.
Figure 2:
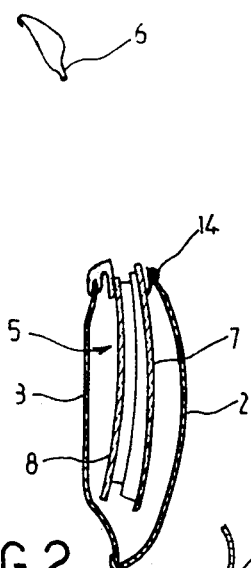
FIG. 2 is a view of a diagrammatic section taken along the line II—II of FIG. 1.
Figure 5:
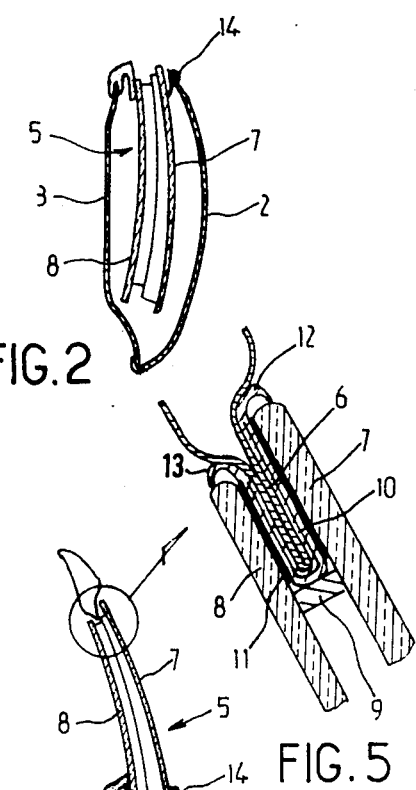
FIG. 5 is an enlarged view of the portion surrounded by a circle in FIG. 4.
Figure 4:
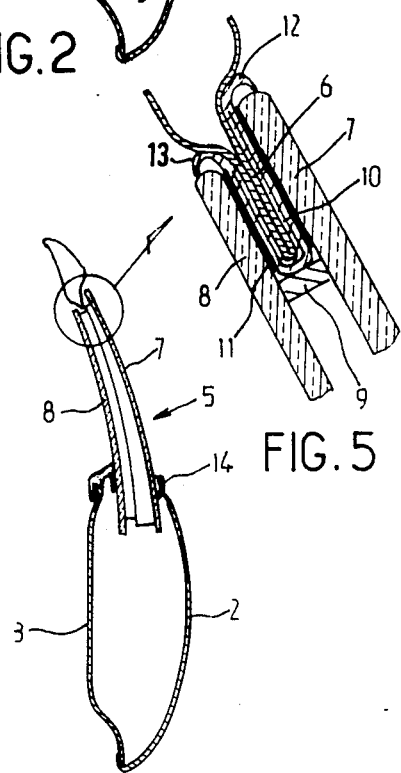
FIG. 4 is a view of a diagrammatic section along the line IV—IV of FIG. 2.

Since the two panes are non-parallel, the outer pane 7 can be arranged in such a way that, when the window is in the closed position, as shown in FIGS. 3 and 4, the outer pane 7 is substantially in the extension of the outer panel 2 of the door, thereby lacking any appreciable discontinuity of curvature. The air penetration of the vehicle is thus greatly improved as compared to motor vehicles equipped with windows of a conventional type.

It will be noted that the panes 7 and 8 have different thicknesses, the outer pane 7 being thicker, to prevent sound resonance.

Due to double glazing, the soundproofing obtained will greatly exceed that of conventional windows and the road and air noises will be greatly reduced, even at high speed.

The embodiments illustrate a considerable advantage of using as a window guide member the rebate 6 which is formed integrally with the door, without the need for any complicated auxiliary member, like those of the prior art. Likewise, the sealing of the windows is improved substantially, without the addition of any supplementary sealing member.

Figure 6:
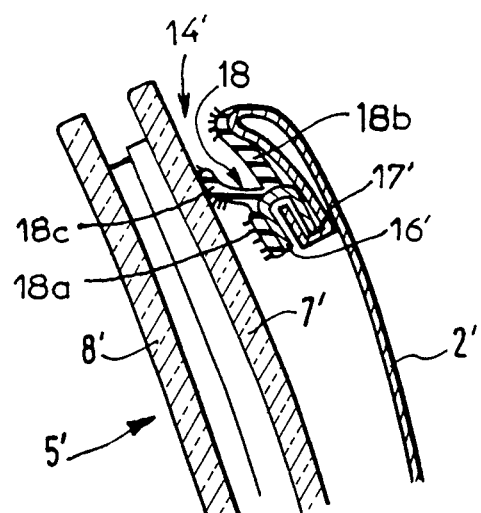
FIG. 6 is a partial view on a larger scale, similar to that of FIG. 1, with an alternate embodiment of body sealing strip.
Figure 7:
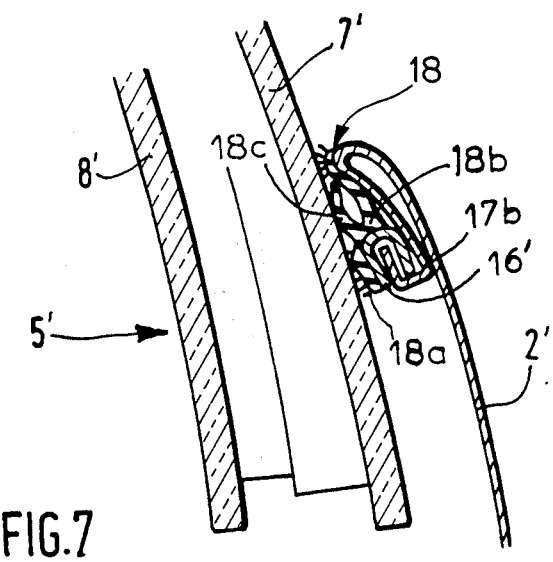
FIG. 7 is a view similar to that of FIG. 6, with the double-glazed window raised.

Referring to FIGS. 6 and 7, an alternate embodiment of the present invention is illustrated, wherein the members described with reference to FIGS. 1 to 5 are designated by the same reference numerals bearing the index'. This embodiment illustrates the possibility of concealing a door sealing strip 14' or "wiper" from view completely when the double-glazed window is in the raised position.

In this embodiment of the invention, the strip 14' comprises a rigid U-shaped reinforcement 16', having one branch engaged in a groove 17' made by forming in the upper edge of the panel 2' of the door.

The reinforcement 16' supports a gasket 18 made of elastomeric material with three branches; one branch 18a fastened against the reinforcement 16', another branch 18b fastened against the edge of the outer panel 2' and another branch 18c bearing against the outer pane 7' of the double-glazed window. Branch 18c is shown both in the low position, referring to FIG. 6 and in the high position referring to FIG. 7, where it is gripped between the pane 7' and the upper edge of the panel 2', thus being completely hidden.

What is claimed is:

1. A movable flush window system, comprising:
   (a) two panels connected together forming a structure having a window aperture with a window receiving side and at least one window contacting side;
   (b) a movable window comprising two substantially non-parallel panes, said window being retractable between said two panels through said window receiving side of said aperture;
   (c) means for engaging said window at the periphery thereof, said engaging means being disposed along said window contacting side of said aperture;
   (d) means for spacing said two panes such that the spacing thereof decreases from a base of said panes to an upper part of said panes, said spacing means receiving said engaging means so as to guide and seal the closure of said window in said aperture.

2. A flush window system as claimed in claim 1, wherein said engaging means comprises edges of said two panels welded together so as to form a rebate and an adjacent flange at the periphery thereof.

3. A flush window system as claimed in claim 1, wherein said spacing means comprises a continuous spacer joined to the opposing faces of said two panes.

4. A flush window system as claimed in claim 1, wherein said spacing means comprises a flexible material.

5. A flush window system as claimed in claim 1, wherein the said engaging means is covered by a reinforcement section coated with a material having a high sliding coefficient.

6. A flush window system as claimed in claim 5, wherein said reinforcement section comprises a lip member for sealing said window system.

7. A flush window system as claimed in claim 1, wherein said two panes each have different thicknesses.

8. A flush window system as claimed in claim 7, wherein an outer pane of said window is thicker than an inner pane.

9. A flush window system as claimed in claim 1, wherein an outer one of said panes partially overlaps an outer one of said panels.

10. A flush window system as claimed in claim 1, wherein an outer one of said panes is substantially flush with an outer surface of an outer one of said panels.

11. A flush window system as claimed in claim 1, further comprising a sealing strip disposed adjacent said aperture along said window receiving side of said aperture.

12. A flush window system as claimed in claim 11, wherein said sealing strip contacts said window only when said window is in a closed or approximately closed position.

13. A flush window system as claimed in claim 11, wherein said sealing strip is substantially concealed when said window is in a closed position.

14. A flush window system as claimed in claim 13, wherein said sealing strip comprises:
   (a) a rigid U-shaped reinforcement connected to an upper edge of said outer panel; and
   (b) a flexible gasket having members, wherein a first of said members is fastened to said reinforcement, a second of said members is fastened to an upper edge of said outer panel and a third of said members is in continuous contact with an outer of said panes.

15. A method of providing a sliding window seal, comprising:
   providing a structure having a window aperture with a window receiving side and at least one window contacting side;
   providing a window having a thickness which varies from a greater thickness at a lower portion to a lesser thickness at an upper portion;
   providing a seal along said window receiving side;
   providing a protuberance along said window contacting side;
   providing a recess in a periphery of said window; and
   mounting said window in said aperture such that said protuberance is received in said recess and such that said greater thickness lower portion of said window contacts said seal as said window is moved upwardly into said aperture through said window receiving side.

* * * * *